United States Patent [19]
Weston-Lewis et al.

[11] Patent Number: 6,134,063
[45] Date of Patent: Oct. 17, 2000

[54] AUTOMATED MULTI-TRACK TRANSFERS

[75] Inventors: Graeme M. Weston-Lewis; David M. Springberg, both of Fort Collins, Colo.

[73] Assignee: LSI Logic Corporation, Milpitas, Calif.

[21] Appl. No.: 08/999,160

[22] Filed: Dec. 30, 1997

[51] Int. Cl.$^7$ ................................................ G11B 5/09
[52] U.S. Cl. .......................... 360/49; 360/78.04; 711/4; 711/112
[58] Field of Search .................... 360/75, 78.04, 360/53, 72.2; 711/112, 4; 714/8

[56] References Cited

U.S. PATENT DOCUMENTS

| | | |
|---|---|---|
| 4,631,723 | 12/1986 | Rathbun et al. . |
| 4,811,124 | 3/1989 | Dujari et al. . |
| 5,075,804 | 12/1991 | Deyring ................................ 360/53 X |
| 5,283,790 | 2/1994 | Kawashita ............................ 711/112 X |
| 5,319,627 | 6/1994 | Shinno et al. . |
| 5,473,761 | 12/1995 | Parks et al. ......................... 711/112 X |
| 5,568,606 | 10/1996 | Dobbek ............................... 711/112 X |
| 5,740,358 | 4/1998 | Geldman et al. ..................... 360/53 X |
| 5,768,044 | 6/1998 | Hetzler et al. ....................... 360/77.08 |
| 5,812,335 | 9/1998 | Kool et al. ........................... 360/51 |
| 5,812,755 | 9/1998 | Kool et al. ........................... 714/8 |
| 5,818,654 | 10/1998 | Reddy et al. ........................ 360/53 |
| 5,822,142 | 10/1998 | Hicken ................................. 360/53 |
| 5,835,930 | 11/1998 | Dobbek ............................... 711/4 |
| 5,890,209 | 3/1999 | Dobbek ............................... 711/112 |
| 5,914,916 | 6/1999 | Totsuka et al. ...................... 369/32 |
| 5,983,309 | 11/1999 | Atsatt et al. ........................ 711/4 |
| 6,026,463 | 2/2000 | Klein ................................... 711/4 |

FOREIGN PATENT DOCUMENTS

| | | |
|---|---|---|
| 0 631 277 A2 | 12/1994 | European Pat. Off. . |
| 2 285 166 | 6/1995 | United Kingdom . |
| WO 95 24038 | 9/1995 | WIPO . |

OTHER PUBLICATIONS

IBM Technical Disclosure Bulletin; vol. 25, No. 8; Jan., 1983; Spiral Read/Write Architecture for Processor–Controlled Diskette Unit; J.T. Billington et al.; pp. 4279–4281.

*Primary Examiner*—Paul Loomis
*Assistant Examiner*—James L Habermehl

[57] ABSTRACT

The present invention is a method to minimize the firmware overhead for multi-track transfers. To this end, the present invention provides a transfer control table. The table is used to manage sector defects or other transfer adjustments. Each entry of the table contains an affected PSA and a corresponding control instruction. The control instruction includes an action such as an interrupt/branch, take no action, skip the sector or skip the following indicated sectors. The interrupt/branch bit causes an preferably when the last sector of a track has been read or written. The table is either entirely generated at the same time or is generated to provide for a track transfer. In the latter case, the remaining table entries are generated during the platter revolution or the track seek. The method provides for minimum microprocessor intervention. To that end, the microprocessor is interrupted only at the end of the multi-track transfer.

14 Claims, 4 Drawing Sheets

| PSA | CONTROL |
|---|---|
| 0 | NOP |
| 0 | WCS BRANCH SKIP |
| 1 | START SKIP |
| 2 | STOP SKIP |
| 3 | WCS BRANCH SKIP |
| 4 | START SKIP |
| 5 | STOP SKIP |

AUTOMATED MULTI-TRACK TRANSFERS

FIELD OF THE INVENTION

The present invention relates to storage devices and more particularly to data transfers with a disk drive.

BACKGROUND OF THE INVENTION

Computer disk drives contain media that store data. The media typically are multiple platters that magnetically store the data. FIG. 1 illustrates an example of a platter 100. Platter 100 contains embedded servo fields, gaps or wedges S1–S4 that extend radially from aperture 110. Typically, there are more servo fields than shown in FIG. 1 and the servos do not have to be aligned. Platter 100 also includes zones Z1 and Z2 where zone Z1 is defined by aperture 110 and circumference 115. Zone Z2 is defined by circumferences 115 and 120. Typically, each zone contains multiple tracks that are each divided into multiple sectors. As shown, zones Z1 and Z2 each include one track where the track of zone Z1 is divided into sectors 1–6 and the track of zone Z2 is divided into sectors 1–11.

Servo fields S1–S4 contain data that is pre-written during the manufacture of the disk drive that contains the platter. The servo data may include the location of the specific servo field and the track of the platter. Servo fields S1–S4 are used to position the heads of the disk drive for read/write operations. Data are stored on platter 100 between servo fields S1–S4 in the sectors. It is very common for at least one sector on platter 100 to be split into one or more fragments by a servo field.

The data is recorded in a density defined as bits-per-inch (BPI). The BPI remains the same over the entire area of platter 100. Tracks located radially farther from aperture 110 than other tracks will have a greater length and will, therefore, be able to store more data. To exploit this increased storage capability, either the disk rotation speed must be increased while the data read/write rate is held constant or the disk rotation speed is maintained at a constant while the data read/write rate is increased. Since the former is impractical, the latter has been chosen for conventional disk drives. Specifically, the data read/write rate is increased as the data is stored farther from aperture 110. However, due to certain considerations, this rate is increased only for each zone, i.e., the data read/write rate for all the tracks in a zone is the same.

As platter 100 rotates, certain pulses are provided to a disk controller. A sector pulse is provided at the beginning of each sector. A servo pulse is typically provided during or at the end of a servo field or wedge. An index pulse is provided once every platter revolution.

Associated with disk drive multi-track transfers are factors such as physical (i.e., mechanical) latency and instruction execution speed by a local processor. To compensate for the physical latency and instruction execution, a built-in track skew is provided. The skew is the amount of sectors it takes to seek to a new track and settle on that track so that a transfer can occur.

Track skew can be as high as twenty percent of the time for a complete platter revolution. More track skew requires more time to provide a multi-track transfer.

Physical latency includes the time required for a head to settle on a track when switching between heads. After manufacture of the disk drive, the heads move relative to each other through decreased mechanical tolerances or temperature. This movement causes uncertainty as to the position of the heads. The decreased mechanical tolerance can be of such magnitude that the heads can be on different tracks.

Physical latency also includes the time required to provide current to the head actuator to move the head. Furthermore, typically at least two servo pulses are required to determine that a head is on the correct track. Seek performance results determine the actual track skew, which results are from tests performed by the disk drive manufacturer. The disk drive is then formatted accordingly.

From the instruction execution aspect of a multi-track transfer, a microprocessor is interrupted at the end of each track. The microprocessor then communicates with the servo control to seek to the next track of the cylinder (i.e., switch heads). Once the seek is performed, a disk formatter is programmed to start transferring from a target physical sector address of that next track. Furthermore, there is a non-deterministic time latency due to microprocessor arbitration and processing interrupts, and physical execution time of the interrupt.

In the process of a transfer, there is a risk that the disk channel may be "starved" if the end-of-track interrupt is not timely executed. The risk is a revolution latency may be incurred. For example, a five microsecond delay in the microprocessor to service an interrupt may cause a revolution penalty. This in turn may cause greater than a five millisecond time penalty in performance. Thus, there is a critical time issue for servicing interrupts.

A need exists for a method of multi-track transfers that minimizes microprocessor firmware overhead and reduces the amount of track skew. The present invention meets this need.

SUMMARY OF THE INVENTION

The present invention is a method to minimize the firmware overhead and seek time for multi-track transfers. To this end, the present invention provides a transfer control table. The table is used to manage sector defects or other transfer adjustments. Each entry of the table contains an affected physical sector address (PSA) and a corresponding control instruction. The control instruction includes an action such as an interrupt/branch, take no action, skip the sector or skip the following indicated sectors. The interrupt/branch instruction activates a bit that causes a preferred interrupt to a sequencer when the last sector of a track has been read or written. Consequently, the microprocessor is interrupted only at the end of the multi-track transfer.

The table is either entirely generated at the same time or is generated to provide for a single track transfer. In the latter case, the remaining table entries for a multi-track transfer are generated during one or more platter revolutions or track seeks by the firmware.

Numerous other advantages and features of the present invention will become readily apparent from the following detailed description of the invention and the embodiments thereof, from the claims and from the accompanying drawings in which details of the invention are fully and completely disclosed as a part of this specification.

DETAILED DESCRIPTION OF THE PREFERRED EMBODIMENTS

Figure 1:
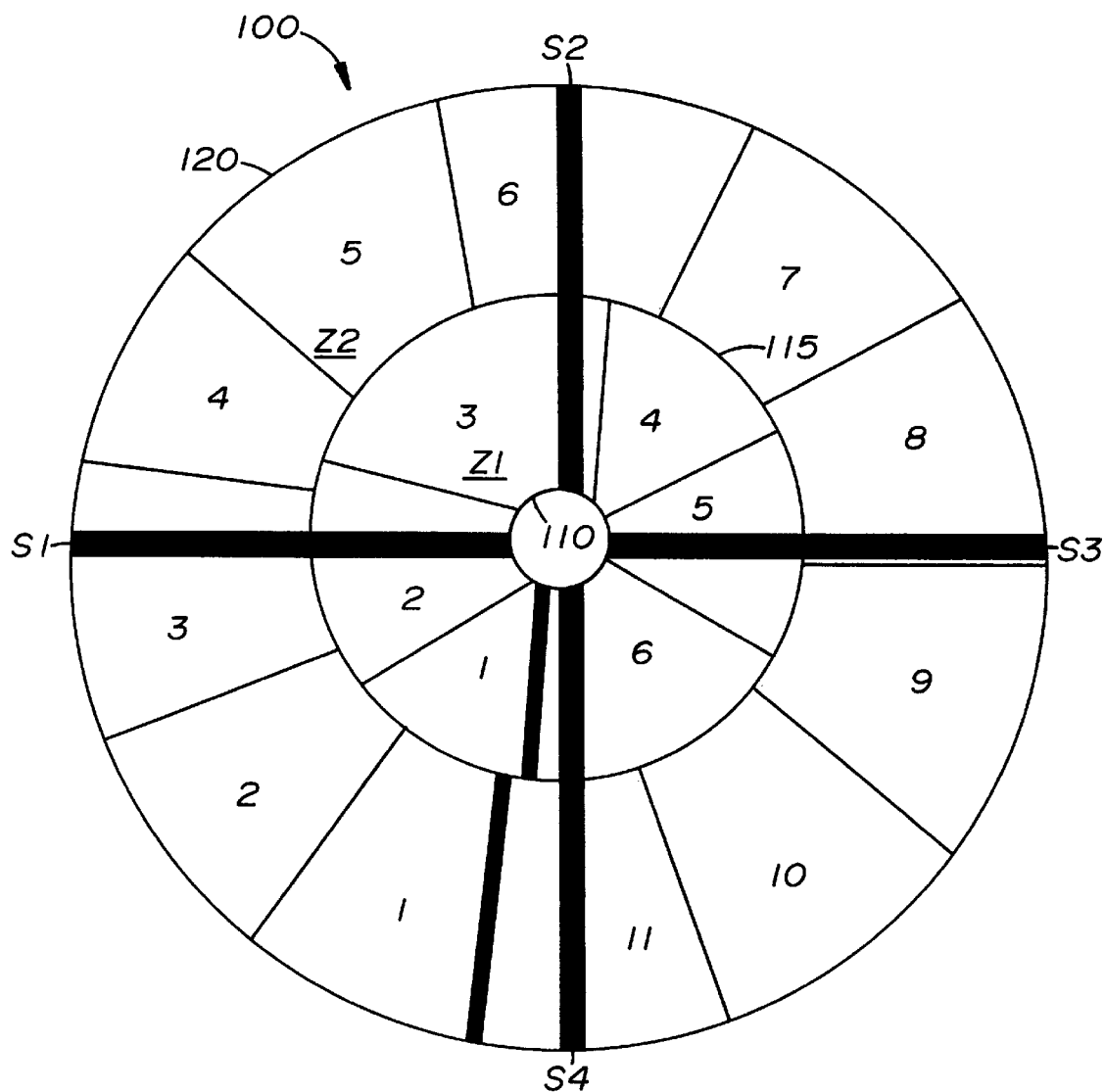
FIG. 1 is a plan view of a disk drive platter.

While this invention is susceptible of embodiment in many different forms, there is shown in the drawings and will be described herein in detail a specific embodiment thereof with the understanding that the present disclosure is to be considered as an exemplification of the principles of the invention and is not to be limited to the specific embodiment described.

Figure 2:
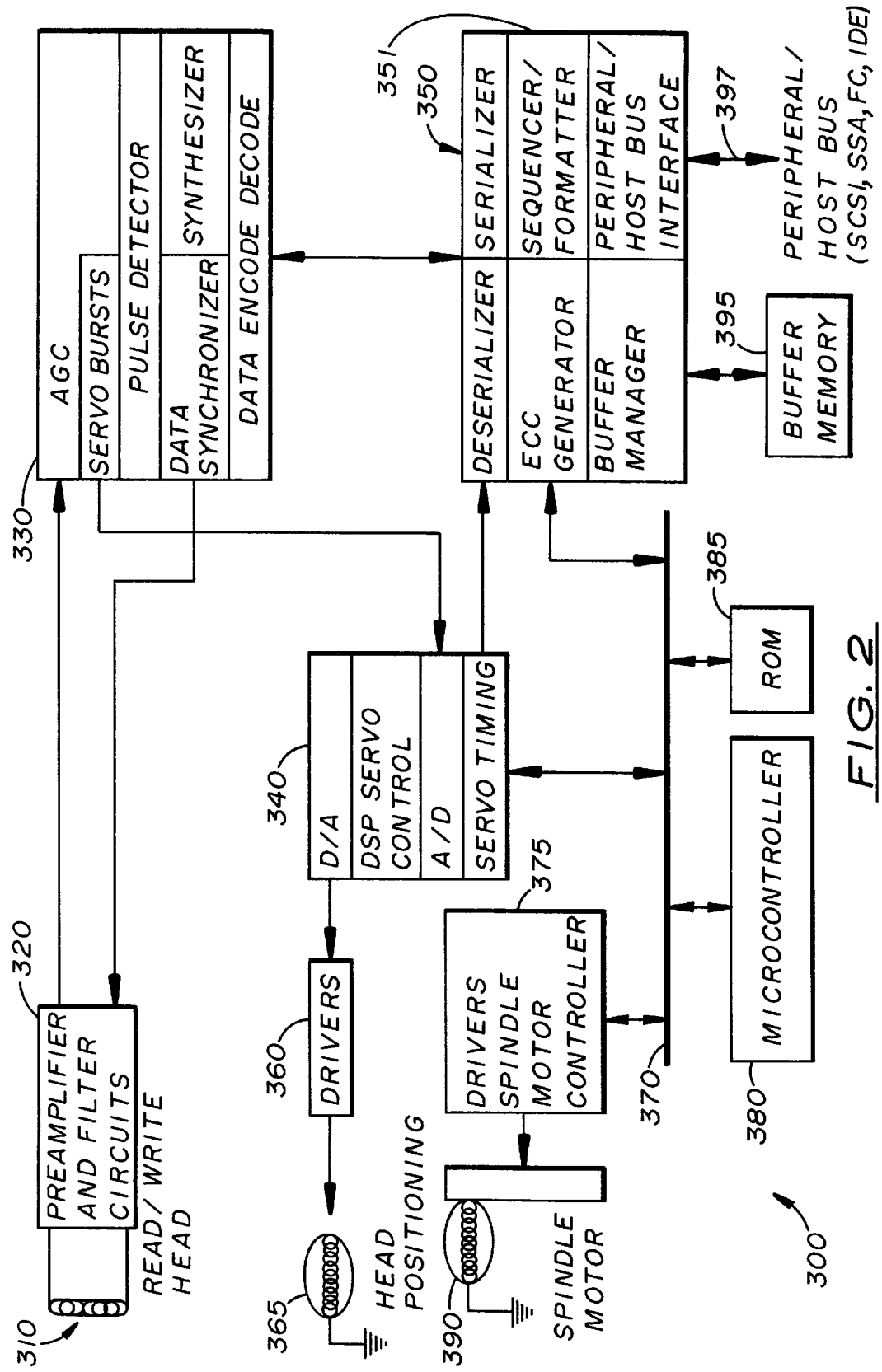
FIG. 2 is a block diagram of a disk controller.

FIG. 2 shows a disk controller 300. Head 310 is coupled to a preamplifier and filter circuit 320. Preamplifier and filter circuit 320 is coupled to read/write channel 330 that is coupled to servo processor 340 and integrated data controller and bus interface 350. Servo processor 340 is coupled to head positioning or actuator 365 via drivers circuit 360. Servo processor is also coupled to a bus 370.

Bus 370 is coupled to a drivers and spindle motor controller 375, a microcontroller 380, a ROM 385 and integrated data controller and bus interface 350. Drivers and spindle motor controller 375 is coupled to spindle motor 390. Integrated data controller and bus interface 350 is coupled to a buffer memory 395 and is coupled to a peripheral/host bus 397. Included in integrated data controller and bus interface 350 is a disk formatter 351 that utilizes a high speed byte wide data path between the disk (not shown) and buffer memory 395.

Positioning logic in formatter 351 is provided to handle sector defect, split and PSA calculations for data seek and transfer operations between the disk and the host. Integrity logic in formatter 351 uses four bytes of buffer memory CRC to encode the LSA (logical sector address) as a host-to-disk integrity check. Formatter 351 receives from servo processor 340 information about where the head is positioned over the disk before any data can be transferred.

A positional PSA counter is loaded at each servo gap and increments for every sector pulse thereafter. While the sequencer is not running, the PSA counter is loaded at each servo gap; if the sequencer is running, then the PSA counter is verified at each servo gap to ensure sector pulse integrity. On seeks, the PSA counter will synchronize to the new zone on the sector pulse after the next servo gap. The PSA counter always runs, and so will reflect the true position for a zone after being synchronized to that zone.

The microprocessor preferably loads a list of PSA addresses into the buffer to control track transfers. The list, also known as a transfer control table, is used to manage defects or other transfer adjustments. This list is preferably stored in a reserved segment of buffer memory 395 (FIG. 2). Each entry contains the affected PSA, a bit to signify whether the LSA should be incremented, an action, an interrupt/branch bit and, preferably, parity. The increment bit should be set for logically skipped sectors and reset for defective sectors. The interrupt/branch bit causes a preferred maskable interrupt and a branch flag typically when the last sector of a track has been read or written.

The action is preferably a "no-op," stop, single step, or start and stop skips. The no-op action informs formatter 351 to to continue with normal functions. This action applies when the last sector of a track has been transferred and the head must change tracks. A stop action usually occurs when the last track sector is transferred. A single skip instruction informs formatter 351 to skip to the next PSA, whereas the start and stop skip actions cause formatter 351 to skip from start PSA to an end PSA when there are multiple contiguous sectors to be skipped.

This list preferably is in the same order as the programmed transfer; that is from the first PSA to the last PSA within the programmed data transfer, including any wrap-overs through zero. During the data transfer, each entry of the transfer control table will be loaded and used for comparison to the start PSA to determine action. There is a separate address pointer for this transfer control table.

The process starts on a table pointer write and stops when the sequencer stops. The start of the table is loaded first, and each subsequent entry is loaded as the current entry is used. This provides for a "prefetch" scheme in that it is known before arriving at a predetermined sector what action should be take. There is no ceiling to the list and the address pointer will increment to load entries until the sequencer stops. Note that a dummy entry preferably is added after the last valid entry since an additional entry will be fetched after the last one is used. Preferably, a dummy entry is also preferred when no defects are present on the target track. In this case, to ensure no PSA match occurs, an illegal value (such as 03 FFh) should be used.

A start PSA register indicates the beginning of the transfer, and a stop threshold register indicates the length of the transfer. A transfer counter register is reset upon a sequencer start and it is incremented at the same time as the LSA counter; that is, it is incremented each time the start PSA is incremented and the sector is not a defect. The transfer length should be set to the total amount of sectors that are either transferred or skipped. After the sequencer is started, the positional PSA is compared with the start PSA on each SECTOR pulse. A comparison of the positional PSA is also done with the Transfer Control PSA. A start flag will be generated to the sequencer if the positional PSA matches the start PSA, the sector is not a defect/skip, and the buffer is ready. Any combination of skips and defects may be programmed within the transfer. When the transfer counter equals the transfer length register, a stop flag is generated to the sequencer. Further discussion is provided in copending U.S. patent application Ser. No. 08/722,729 Oct. 2, 1996, entitled "HEADERLESS FORMATTED DISK DRIVE," assigned to the assignee of the present invention and incorporated herein by reference.

Figures 3, 4:
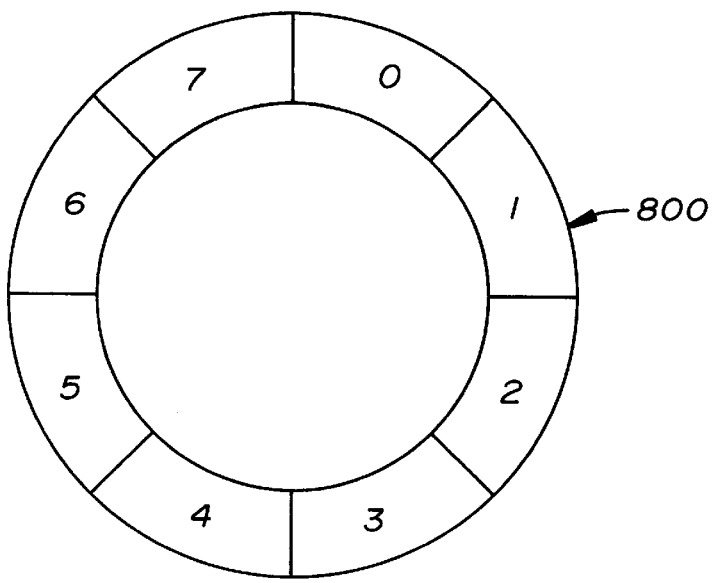
FIG. 3 illustrates the physical sector addresses of a track on a disk drive platter.
FIG. 4 is a table showing the correspondence between the physical sector and logical block addresses according to another aspect of the present invention.

Turning to the method of multi-track transfers, reference will be made to FIGS. 3–6. FIG. 3 shows a track 800 on a surface of a platter (not shown). The track as shown has eight sectors 0–7, which represent the physical sector addresses (PSAs). Coincidentally the logical sector addresses (LSAs) correspond one-to-one with the PSAs since the shown track has no errors.

To compensate for the time required for a head seek between tracks of the same cylinder ("track skew"), the LSAs are shifted. To illustrate, FIG. 4 shows a table indicating three tracks T0, T1, T2 of the same cylinder, each track having eight sectors with PSAs 0–7 (shown at the top of the table). A separate head is associated with each track.

Figures 5, 6:
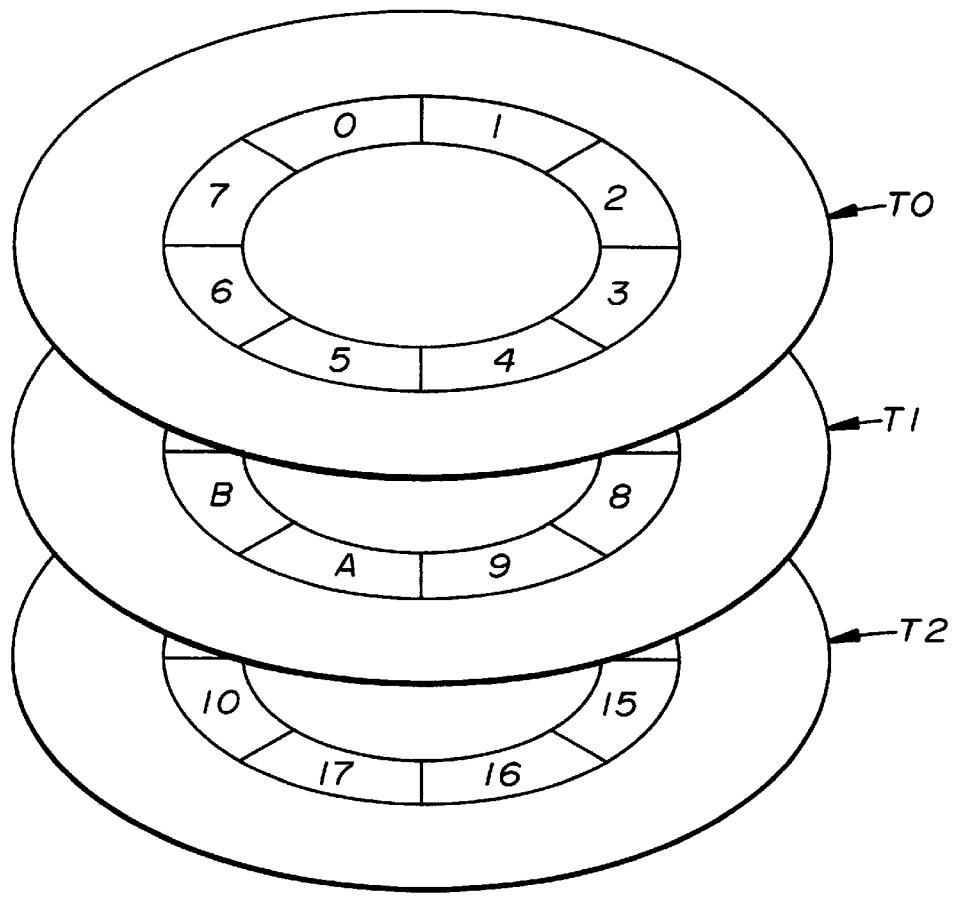
FIG. 5 illustrates multiple disk platters having the corresponding logical block addresses adjusted for track skew according the FIG. 9 table.
FIG. 6 is a multi-track transfer control table according to the FIG. 9 aspect of the present invention.

Each sector of the table is labeled with an LSA in hexadecimal. Note that the LSAs for track T0 correspond one-to-one with the PSAs. The LSAs for T1 and T2 do not correspond one-to-one with the PSAs. For track T1, LSA 8 is skewed three sectors to PSA 3. For track T2, LSA 10 is skewed three sectors (relative to track T1) to PSA 6. In this manner, the track skew is compensated. The physical relationship between the LSAs of tracks T0, T1 and T2 is shown in FIG. 5.

This method of the present invention uses firmware to generate a multi-track transfer table when a transfer request is received by a disk drive, usually from a host. This table, illustrated in FIG. 6, can be stored in the buffer memory of a drive controller or any other available memory. The firmware then informs a disk formatter state machine (e.g., writeable control store) that utilizes the table where the table is located.

In operation, the disk controller receives a transfer request from a host. For example, the host can be requesting a read of twenty sectors with LSAs 0–19. A logical-to-physical address conversion is performed that converts the first LSA into a target cylinder, head (track) and startPSA. The firmware then generates a table from that cylinder, track and start PSA as shown in FIG. 6. The first PSA corresponding to the first LSA of the transfer request is stored in memory. A corresponding control instruction is stored in the table that provides instructions to the drive controller. The first line or entry of the table shown in FIG. 6 stores PSA 0. The corresponding control instruction is a "no operation" NOP. The second line or entry also has PSA 0 stored. This instruction will not be executed until all the sectors have been read. The corresponding control instruction preferably will cause a signal to be generated that will inform the servo controller to seek to the next track. The other corresponding control operation is that the information of sector 0 of track T0 should be skipped since it has already been read.

The following steps can be performed with the steps above or can be performed while the steps above are being performed. The firmware knows that because of the track skew, PSAs 0, 1 and 2 of track T1 must be skipped. Accordingly, the multi-track transfer table of FIG. 6 has PSA 1 entered along with the control instruction start skip. PSA 2 is also saved with the corresponding control instruction stop skip.

Since LSA 8 (PSA 3 of T1) starts the read operation again for track T1, the second occurrence of LSA 8 will signify that track switch must occur. Therefore, when the corresponding PSA 3 of track T1 is encountered for the second time, a WCS branch is initiated and the same steps for the second entry of PSA 0 are repeated. PSAs 3, 4 and 5 of track T2 must be skipped because of track skew. The multi-transfer table of FIG. 6 has PSA 4 entered along with the control instruction start skip and PSA 5 entered with corresponding control instruction stop skip. LSA 10 (PSA 6 of T2) starts the read operation again for track T2.

Typically, disk drives have defective sectors. The present invention compensates for such sectors by providing a table entry for the defective sector. The corresponding control instruction will be at least a skip sector instruction. In this situation, the LSA counter may not be incremented.

The drive controller maintains the number of transferred sectors. In this case, when that number is twenty, the transfer is complete. Preferably, the multi-track transfer table has a termination entry after PSA 5 that is a value that is unobtainable, such as 3 FF.

Through the use of the multi-track transfer control table and transfer length counter, it is possible to set up a multi-cylinder transfer. For example, a multiple cylinder transfer could be set up, and the microprocessor would not get an end of transfer interrupt until the end of the transfer. The microprocessor is interrupted only once for a multi-track transfer (at the end) instead at the end of each track as previously described. In this manner, the track skew is minimized.

The microprocessor can take the following steps to initiate a multi-track transfer:

1. A Transfer Control table for each track must be calculated.
2. For each seek between tracks, the number of sector skew must be calculated; the skew is the amount of sectors it takes to seek to a new track and settle on that track so that a transfer can occur.
3. The first track Transfer Control table entries must be built up for a normal track transfer.
4. Skip start and skip end entries should be added. The start skip PSA should be the final track PSA plus one; the end skip PSA should be the start skip PSA plus the number of sectors for track skew. In the case that the LSA is skewed in terms of physical location to account for track skew, the skip should be a "defect" skip so that the LSA is not incremented by the skipped sectors. If it is desired to increment the LSA during the seek, a combination of regular and defect skips can be implemented to achieve the desired amount of LSA adder. An End Of Track signal can be-generated by programming the start skip PSA with the Interrupt/Branch bit set. The sequencer can be programmed to branch on this bit and could set an OUTPUT pin to inform the Servo system that it should initiate a seek to the next track.
5. The next track Transfer Control table is built on top of the skip entries.
6. Each successive track follows this method.
7. The transfer length should be set to the total amount of sectors that are either transferred or skipped "normally"; the defect skips should not be included in the transfer length.

The flexibility of this method is not limited to cylinder transfers; the transfer may be as large as the system allows. The only other limiting factors are counter sizes: the PSA is 10 bits (1 k sectors/track) and the transfer length counter is 16 bits (64 k sectors per transfer maximum). Any of these limiting factors could be easily expanded. This scheme can be made more efficient by interlocking the servo logic seek function in a customized application.

The present invention provides at least a threefold advantage: reduction in the chances of a revolution penalty when the microprocessor is busy with other functions and should be servicing a transfer interrupt; reduction of the track seek latency; and freeing microprocessor bandwidth for other functions.

Numerous variations and modifications of the embodiment described above may be effected without departing from the spirit and scope of the novel features of the invention. It is to be understood that no limitations with respect to the specific device illustrated herein are intended or should be inferred. It is, of course, intended to cover by the appended claims all such modifications as fall within the scope of the claims.

We claim:

1. A method of multi-track transfers, comprising the steps of:
   (a) receiving a logical sector address transfer request by a disk controller from a host;
   (b) converting each logical sector address to a physical sector address;
   (c) converting a first logical sector address to a target cylinder, track, and start physical sector address;
   (d) generating a list of entries based on said target cylinder, track, and start physical sector address;
   (e) loading said list of entries into memory;
   (f) comparing each entry of said first list to a start physical sector address;

(g) performing the proper action based on said comparison of each entry with said start physical sector address;

(h) counting the number of transferred sectors by said disk controller; and (i) comparing said number of transferred sectors with said logical sector address transfer request to determine completion of transfer.

2. The method as claimed in claim 1, wherein said converting each logical sector address to a physical sector address results in a skewing of logical sector addresses to compensate for track skew.

3. The method as claimed in claim 1, wherein said list of entries manages at least one of defects and transfer adjustments.

4. The method as claimed in claim 1, wherein said list of entries is in the same order as said transfer request.

5. The method as claimed in claim 1, wherein said list of entries further comprise at least one of an increment bit for a logical sector address, an action, an interrupt bit, and a parity.

6. The method as claimed in claim 5, wherein said interrupt bit allows a microprocessor to be interrupted only at the end of said multi-track transfer.

7. The method as claimed in claim 5, wherein said action comprises at least one of a no operation function, stop, single step, start skip, and stop skip.

8. A program of instructions storable on a medium readable by an information handling system for causing the information handling system to execute steps to perform a multi-track transfer, the steps comprising:

(a) receiving a logical sector address transfer request by a disk controller from a host;

(b) converting each logical sector address to a physical sector address;

(c) converting a first logical sector address to a target cylinder, track, and start physical sector address;

(d) generating a list of entries based on said target cylinder, track, and start physical sector address;

(e) loading said list of entries into memory;

(f) comparing each entry of said first list to a start physical sector address;

(g) performing the proper action based on said comparison of each entry with start physical sector address;

(h) counting the number of transferred sectors by said disk controller; and (i) comparing said number of transferred sectors with said logical sector address transfer request to determine completion of transfer.

9. The program of instructions as claimed in claim 8, wherein said converting each logical sector address to a physical sector address results in a skewing of logical sector addresses to compensate for track skew.

10. The program of instructions as claimed in claim 8, wherein said list of physical sector addresses manages at least one of defects and transfer adjustments.

11. The program of instructions as claimed in claim 8, wherein said list is in the same order as the transfer.

12. The program of instructions as claimed in claim 8, wherein said list of entries further comprise at least one of an increment bit for a logical sector address, an action, an interrupt bit, and a parity.

13. The program of instructions as claimed in claim 12, wherein said interrupt bit allows a microprocessor to be interrupted only at the end of said multi-track transfer.

14. The program of instructions as claimed in claim 12, wherein said action comprises at least one of a no operation function, stop, single step, start skip, and stop skip.

* * * * *